US008762405B2

(12) United States Patent
Qian et al.

(10) Patent No.: US 8,762,405 B2
(45) Date of Patent: Jun. 24, 2014

(54) SEARCH BEHAVIOR BASED COMMUNICATION FORUMS

(75) Inventors: Richard J. Qian, Sammamish, WA (US); Steven William Macbeth, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 159 days.

(21) Appl. No.: 13/018,173

(22) Filed: Jan. 31, 2011

(65) Prior Publication Data
US 2012/0197927 A1 Aug. 2, 2012

(51) Int. Cl.
*G06F 17/30* (2006.01)
(52) U.S. Cl.
USPC .......................................................... 707/769
(58) Field of Classification Search
USPC .................................................. 707/2, 3, 769
See application file for complete search history.

(56) References Cited

U.S. PATENT DOCUMENTS

| 7,818,340 | B1 | 10/2010 | Warren |
| 2007/0174244 | A1 | 7/2007 | Jones |
| 2007/0226183 | A1* | 9/2007 | Hart et al. .......................... 707/3 |
| 2008/0282169 | A1 | 11/2008 | Chang et al. |
| 2009/0006324 | A1 | 1/2009 | Morris et al. |
| 2009/0063990 | A1 | 3/2009 | Morris et al. |
| 2009/0132500 | A1 | 5/2009 | Jones et al. |
| 2009/0216757 | A1* | 8/2009 | Sen et al. ........................... 707/5 |
| 2009/0307205 | A1* | 12/2009 | Churchill et al. ................. 707/5 |
| 2010/0057569 | A1 | 3/2010 | Cantelmo et al. |
| 2011/0066607 | A1* | 3/2011 | Wong ............................ 707/706 |

OTHER PUBLICATIONS

Melissa, "Before and After Twitter; Marketing and Messaging," retrieved on Oct. 28, 2010 at <<http://blog.optimum7.com/melissa/social-media/before-and-after-twitter-marketing-and-messaging.html>>, Jun. 4, 2009, 5 pgs.

* cited by examiner

*Primary Examiner* — Etienne LeRoux
(74) *Attorney, Agent, or Firm* — Dan Choi; Carole Boelitz; Micky Minhas

(57) ABSTRACT

One or more computing devices may be configured to determine an association between at least a first user and a second user based at least on search behavior of the first user and/or the second user. Responsive to the determining, the one or more computing devices may enable a communication forum between the first user and the second user.

21 Claims, 4 Drawing Sheets

SEARCH BEHAVIOR BASED COMMUNICATION FORUMS

BACKGROUND

Man endeavors to find answers. Over the ages, bards, books, schools, and churches have existed in large part to provide those answers. Recently, another source of answers has become preeminent: the search engine. By providing a selected set of web pages that are relevant to a user query, the search engine gives the testimony of the past and allows access to new discoveries in every field. But even with the ability to propose highly relevant web content as answers to user questions, some questions remain unanswered. Often these are highly specific questions that only a handful of people have ever asked. For example, a user may seek to know if anyone else has had the same problem with a television of a certain model number and, if so, to find out what they did about it. Even when the results returned by search engines do provide answers, the user often must wade through many duplicative, unrelated, and otherwise unhelpful search results to discover those answers. Reviewing these many results to discover an answer can be time consuming and frustrating.

Further, in seeking answers, we often aren't alone. Similar queries are submitted by many users, and each of these users may process similar results to the similar queries differently based on differing backgrounds, differing result selections, or other differing traits or behaviors. Search engines do not enable users to benefit from each others' search activities, however. Complementary knowledge is not shared and efforts are duplicated. Rather than helping users work together to quickly find answers, search engines are designed for seekers to struggle alone.

SUMMARY

To bring users that are engaged in similar searches together, one or more computing devices are configured to enable those users to engage in a communication forum. For example, the computing devices may enable the users to communicate using a bulletin board, a web page, a chat room, an instant messaging conversation, a video conference, a video call, an audio conference, an audio call, or a scratch pad. In some examples, the computing devices may also be configured to determine the users that should engage in the communication forum. The computing devices make this determination based, for example, on search behavior of a least one of the users. Such search behavior may include search queries, patterns of previous searches, previous search results, or interactions with search results, for example. In one implementation, the computing devices may determine that the search behavior of a number of users is similar and may enable a communication forum between those users by initiating the communication forum, by providing an instruction to a user to initiate the communication forum, or by providing a user with a list of other users having similar search behavior.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Figure 1:
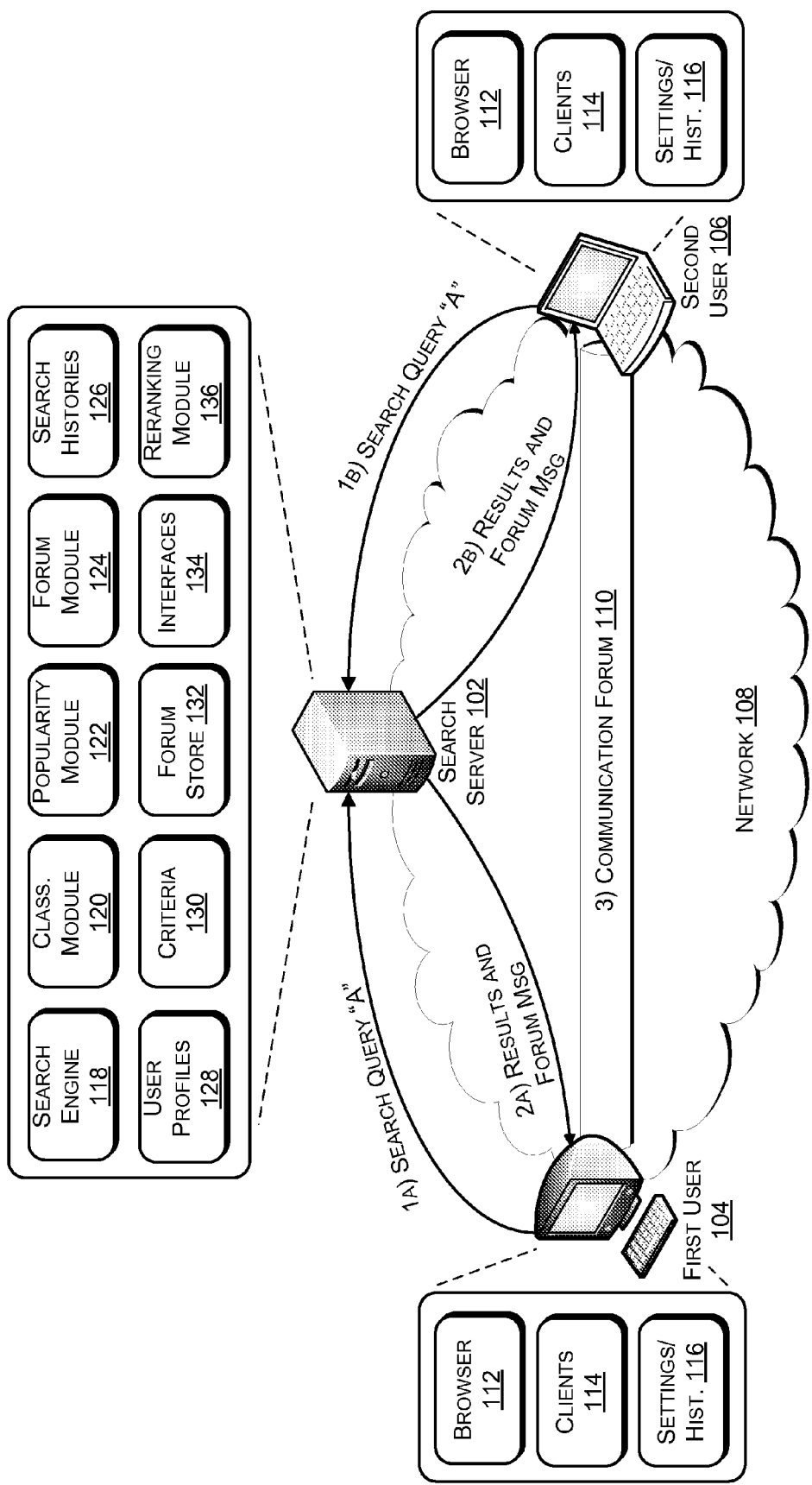
FIG. 1 illustrates an example operating environment, including a server system that enables communication forums between users based on search behavior, in accordance with various embodiments.

This application describes techniques for associating users based on search behavior and enabling those users to engage in a communication forum. For example, the techniques may be implemented in one or more computing devices associated with a search engine. Upon receiving a search query, the computing devices may determine an entity associated with the search query and, optionally, with other search behavior of the user. Such other search behavior may include patterns of previous searches, previous search results, or interactions with search results, for example. The computing devices may then determine one or more other users associated with that entity. Upon making that determination, the computing devices may enable the users to engage in a communication forum, such as a bulletin board, a web page, a chat room, an instant messaging conversation, a video conference, a video call, an audio conference, an audio call, or a scratch pad. The enabling may include initiating the communication forum, by providing an instruction to a user to initiate the communication forum, or by providing a user with a list of other users having similar search behavior.

In some implementations, the computing devices may also utilize one or more criteria in determining users that should engage in a communication forum. For example, the criteria could include one or more of an amount of time between search queries of different users, a location of a user, information retrieved from or associated with social networks, or an organization of a user. These criteria may also be adjusted by the computing devices based on the popularity of a user's search query. For example, the criteria could include a preference for other users that the querying user knows, and the computing devices could give more weight to that preference when the query is popular.

Also, in some implementations, the user's participation in communication forums may be conditioned on settings or preferences of the user. The settings or preferences may be associated with a browser, a search engine, or a social network.

In various implementations, the communication forums may have a number of uses and characteristics. For example, the communication forums may be configured so as not to interfere with user browsing activity or viewing of search results. Also, the communication forums may include links to other communication forums, may be used in reranking search results, and may be stored for later retrieval. Stored communication forums may be public and searchable by other users, and alerts may be sent to previous communication forum participants when the communication forum is updated. Further, communication forums may include a reputation or role for some or all of the participants of the communication forum. The reputation or role may be determined based on a participant's interactions in the communication forum and be may associated with privileges that enable management of the communication forum.

In some embodiments, in addition to or instead of enabling the communication forum, the computing devices may provide users with an indication of how many users are searching for the same query or a similar query, may provide users with aggregate information about other users that are searching for the same query or a similar query, or may provide users with search behavior of other users that are searching for the same query or a similar query, such as links clicked on by the other users.

In addition to the operations mentioned above, the computing devices may also enable an entity discussed in the communication forum to provide an advertisement or support to at least one of the first user or the second user and/or may enable publishing of comments entered in the communication forum to one or more social networks, blogs, or web pages.
Example Operating Environment FIG. 1 illustrates an example operating environment, including a server system that enables communication forums between users based on search behavior, in accordance with various embodiments. As shown in FIG. 1, a search server 102 may receive search queries or other search behavior from a first user 104 and a second user 106. The search server 102, first user 104, and second user 106 may all communicate using the network 108. Based at least on the search queries or search behavior, the search server 102 may enable a communication forum 110 between the first user 104 and the second user 106.

As is further shown, each of the first user 104 and the second user 106 may have a browser 112, other client applications 114, and settings or history 116. These modules and data may be utilized by the first user 104 and the second user 106 in performing searches and engaging in communication forums 110.

Also, the search server 102 includes modules and data 118-136. These modules and data 118-136 include a search engine 118, a classification module 120, a popularity module 122, a forum module 124, search histories 126, user profiles 128, criteria 130, forum store 132, interfaces 134, and reranking module 136. The modules and data 118-136 may be used to associate users and enable those users to engage in communication forums.

Figure 4:
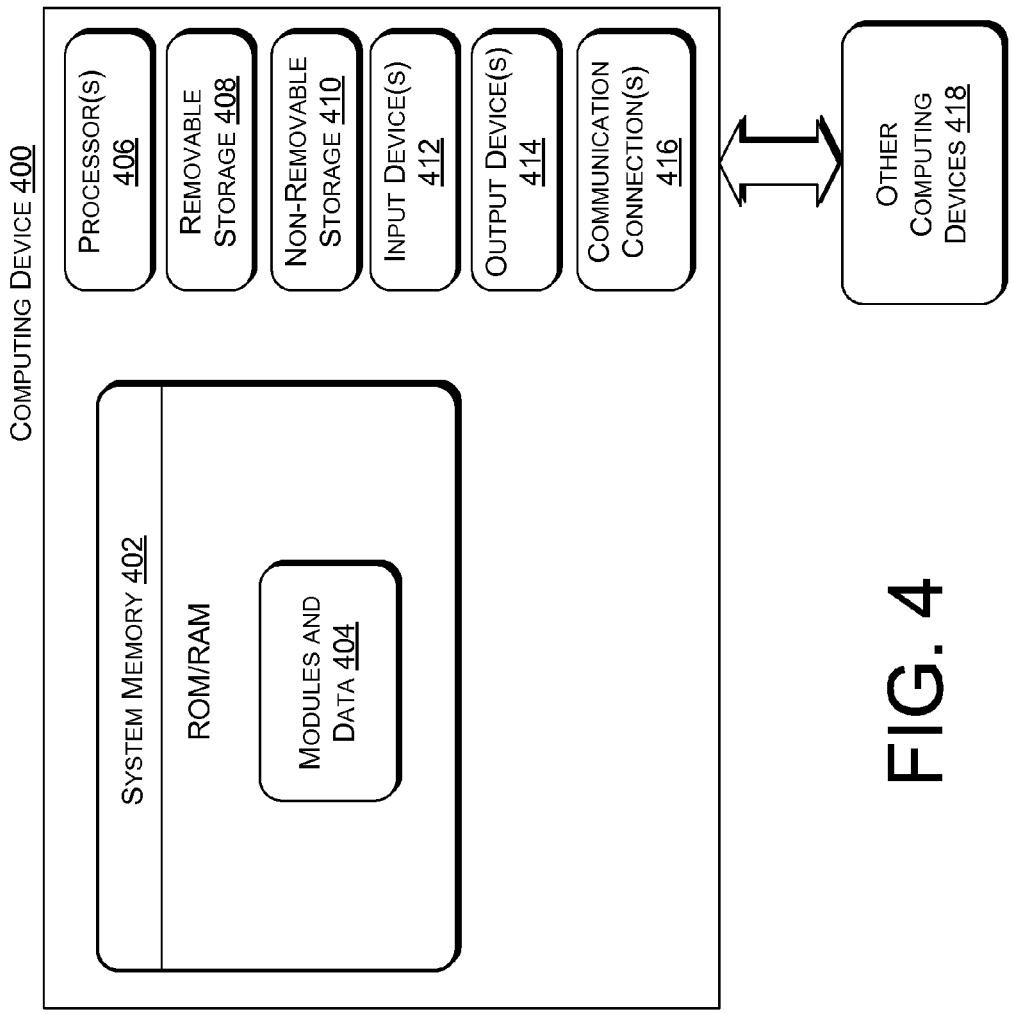
FIG. 4 is a block diagram of an example computer system architecture, in accordance with various embodiments.

In various embodiments, the search server 102 may be any sort of computing device or computing devices. For example, the search server 102 may be or include a personal computer (PC), a laptop computer, a server or server farm, a mainframe, or any other sort of device or devices. In one implementation, the search server 102 represents a plurality of computing devices working in communication, such as a cloud computing network of nodes. When implemented on multiple computing devices, the search server 102 may distribute the modules and data 118-136 among the multiple devices. For example, the search engine 118 and forum module 124 could be implemented on different computing devices. In one implementation, the search server 102 is associated with a search service, such as the Bing® Search Engine offered by the Microsoft Corporation of Redmond, Wash. The nature and functions of the modules and data 118-136 are described further herein. An example search server 102 is illustrated in FIG. 4 and is described below in greater detail with reference to that figure.

First user 104 and second user 106 represent two distinct users on one or more computing devices. Each user 104/106 may be identified to the search server 102 by a pair that includes a computing device identifier and a browser identifier, or by a social network login. In other implementations, other sorts of identifiers may be used. Each user 104/106 utilizes a computing device, however, and those computing devices may include PCs, laptop computers, tablet computers, work stations, servers, telecommunication devices, personal digital assistants (PDAs), media players, media center devices, personal video recorders (PVRs), televisions, or any other sort of devices. As used herein, "first user 104" and "second user 106" refer to both the users and the computing device(s) of the users. First user 104 and second user 106 may each be associated with an organization (such as an employer), a location, a history of search behavior, settings or preferences, a contact list, a social network, email and instant messaging clients, a location or locations, and any number of other characteristics. First user 104 and second user 106 may engage in any number of activities, such as searching, web browsing, social networking, instant messaging, and many other sorts of activities that are performed on computing devices. An example computing device of the first user 104 or the second user 106 is illustrated in FIG. 4 and is described below in greater detail with reference to that figure.

In some implementations, network 108 represents any one or more networks, such as wide area networks (WANs), local area networks (LANs), or the Internet. Network 108 may be public, private, or include both public and private networks. Also, network 108 may be wired, wireless, or include both wired and wireless networks. Network 108 may utilize any one or more protocols for communication, such as the Internet Protocol (IP), other packet based protocols, or cellular communication protocols, such as protocols associated with second generation, third generation, fourth generation, or later generation protocols. Network 108 may comprise any number of intermediary devices, such as routers, base stations, access points, firewalls, or gateway devices.

In various implementations, the communication forum 110 serves as a medium for the first user 104 and the second user 106 to engage in communication, such as communication about a common search interest. While FIG. 1 shows the communication forum 110 as a sort of channel directly connecting the first user 104 and the second user 106, other devices—such as search server 102 or another server or device—may be involved as intermediary devices or in initiating the communication forum 110. For example, if the communication forum 110 is a web bulletin board or chat room, then a server, such as search server 102, may provide the bulletin board or chat room as a web page to the first user 104 and the second user 106. The users 104/106 may then communicate with each other by posting messages to the server 102, which adds the messages to the bulletin board or chat room and transmits an updated bulletin board or chat room to the first user 104 and the second user 106. Communication forum 110 may also be a scratch pad. As used herein, a "scratch pad" is a bulletin board that is specific to a user, such as first user 104 or second user 106, which include a number of communications from multiple communication forums 110. Scratch pads may be stored both locally and on a network device, such as a server, or may only be stored locally or only be stored on a network device. If the communication forum 110 is an instant messaging conversation, one of the users 104/106 or the search server 102 may contact an instant messaging server to initiate an instant messaging conversation between the first user 104 and the second user 106. Instant messaging clients of the first user 104 and second user

106 may then continue the communication forum 110 in a peer-to-peer manner. If the communication forum is an audio or video call or conference, client applications of the first user 104 and the second user 106, such as a Skype client, may be used to initiate and carry on the communication forum 110. These example communication forums 110 are provided only for the sake of illustration and in no way limit the mediums that may be used as communication forums 110.

In some implementations, the communication forum 110 may include additional users besides the first user 104 and second user 106. The number and choice of users may be determined entirely by the search server 102 or by both the search server 102 and one of the users 104/106. While all participating users may join the communication forum 110 at the same time, users may also join over a period of time. For example, communication forum 110 may start as a bulletin board between the first user 104 and the second user 106. After some time, the search server 102 may determine that another user should join the communication forum 110 and may enable that other user to join the communication forum 110.

In further implementations, the first user 104 and second user 106 may participate in the communication forum 110 at different times. In such implementations, the search server 102 or another device stores a copy of the content of the communication forum 110 and provides that content to a user 104/106 when the user 104/106 joins the communication forum 110, even if the other user 104/106 has already left the communication forum 110.

As mentioned above, first user 104 and second user 106 may each have modules and data 112-116. Of these, browser 112 may be any sort of web browser, such as the Internet Explorer® web browser. The browser 112 may communicate with any number of web servers to retrieve and display web pages. Browser 112 may also transmit content entered by a user 104/106 into the browser 112 by posting the content to a server. For example, if the browser 112 has retrieved the Bing® search engine, the browser 112 may display a query entry page into which a user 104/106 may type a search query. The user 104/106 then posts the search query in some manner (e.g., clicking on a button displayed on the web page) which causes the search query to be transmitted to the Bing® search engine (which may be search engine 118). In response, the browser 112 receives a search results page, which it displays to the user 104/106. In some implementations, the browser 112 may also or instead display the communication forum 110 (e.g., when the communication forum 110 is a bulletin board). The browser 112 may display the communication forum 110 in a separate window, enabling simultaneous viewing of both search results and the communication forum 110, or may display the communication forum 110 in place of the search results.

In some implementations, the browser 112 may receive a list of users, with whom the user may select to engage in a communication forum 110. This list may be viewed as a web page, and the names of the users may be clickable or selectable in some other manner. Upon clicking/selecting the names, those names may be transmitted to the search server 102 to enable the search server 102 to initiate the communication forum 110. In other implementations, browser 112 may be equipped with a plug-in that enables the browser 114 to interface with client applications 114 to request those applications to initiate the communication forum 110. For example, browser 112 may have a plug-in enabling the browser 112 to communicate with an instant messaging client application 114 by requesting a list of instant messaging buddies, determining if a selected name provided by the search server 102 matches a buddy, and, if so, instructing the instant messaging client application 114 to start an instant messaging conversation with that buddy as the communication forum 110.

In various implementations, the client applications 114 may be any sort of client applications, such as an instant messaging client or a video or audio communication client. Examples of such clients include the Windows Messenger® instant messaging client and the Skype® client for voice-over-IP (VOIP) calling. These client applications 114 may receive instructions to engage in the communication forum 110 from servers, such as an instant messaging server, from the search server 102 through an interface of the search server 102, or through a plug-in to browser 112, as described above.

In some implementations, settings or history 116 may include settings for browser 112 and/or client applications 114. The settings or history 116 may also include histories of browsing activity or client activity. For example, settings or history 116 may include cookies that are transmitted to the search server 102 to convey user preferences, such as a preference against engaging in communication forums 110 or a preference to only engage in communication forums 110 with others that the user 104/106 knows. These preferences may have previously been submitted using a preferences or settings page of the search engine. The browsing history may be a conventional browsing history of web pages visited, search queries submitted, search results clicked on, etc. Also, the user may be notified and given an opportunity to opt out of sharing the personal information such as histories of browsing activity or client activity. Alternatively or additionally, the history 116 may include the above-described scratch pad.

As mentioned above, search server 102 includes a number of modules and data 118-136 implemented on one or more computing devices. Among these modules and data 118-136, the search engine 118 may be responsible for receiving and answering search queries of the first user 104 and the second user 106, for answering those queries, and for invoking the forum module 124 to enable communication forum 110. The search engine 118 may be any sort of search engine, such as the Bing® search engine that receives and classifies queries, determines results for the queries, and provides the results to the users 104/106. For example, as shown in FIG. 1, the search engine 118 may receive search queries from both the first user 104 and the second user 106. These queries may be received concurrently or over a period of time. The search engine 118 may receive these queries after previously transmitting web pages enabling the users 104/106 to enter and post the search queries. The search engine 118 may also retrieve settings or history 116, in the form of cookies, from the first user 104 and the second user 106. Upon receiving the search queries, the search engine 118 may determine a set of search results based on the search queries and may generate a page to transmit the search results to the users 104/106. In determining the search results, the search engine 118 may invoke the classification module 120 to determine an entity associated with the search query and may then determine results associated with that entity and query in a particular order. For example, if the query was "Inception," the classification module 120 may classify "Inception" as a movie, and the search engine 118 may proceed based on the query string "Inception" and its entity movie to generate more relevant results. Also, in some implementations, the search engine 118 may invoke the popularity module 122 to determine the current popularity of search queries and may include the current popularity with the search results. Upon generating the search results, the search engine 118 transmits the search results pages to the first user 104 and the second user 106, as shown in FIG. 1. As mentioned above, these search results may be provided concurrently with the communication forum 110.

In various implementations, classification module 120 matches queries to entities that serve as categories for the queries (e.g., "movie" as a category for "Inception"). The classification module 120 utilizes well known string matching and machine learning techniques to determine entities for queries. In one implementation, a user profile 128 or search history 126 specific to a user 104/106 may be utilized by the classification module 120 to determine an entity. For example, if the query submitted is "chow," the classification module 120 might return "food" as the entity by default. If the search history 126 of the user 104/106 submitting "chow" shows recent searches for "retriever" and "spaniel", however, the classification module 120 would instead return "dog" as the entity.

In some implementations, the popularity module 122 is notified of each submitted search query and a time at which the search query was received. Based on this information, the popularity module 122 calculates a popularity score for each search query or a ranking of the search queries. If a score, the score may be given as a total number of the queries received or a percentage of the queries received. The popularity module 122 is invoked by either or both of the search engine 118 or the forum module 124.

In addition to invoking the classification module 120 and the popularity module 122, the search engine 118 may invoke the forum module 124. The forum module 124 is configured to determine users 104/106 that should engage in a communication forum 110 and to enable those users 104/106 to engage in the communication forum 110. The search engine 118 may automatically invoke the forum module 124 with any search or may do so conditionally based on user settings or preferences or based on other criteria. Such other criteria may include the popularity of the query or a pattern of search behavior. For example, if the user tries a certain number (e.g., 3) of semantically similar queries, the search engine 118 may invoke the forum module 124. Also, user settings or preferences may include a setting indicating that the user is not interested in participating in a communication forum 110. Upon detecting such a setting, the search engine 118 refrains from invoking the forum module 124. These user settings and preferences may be provided, for example, in a cookie that was retrieved from the user 104/106, in the manner described above.

In various implementations, the forum module 124 receives one or both of the search query or entity from the search engine 118 upon being invoked. If receiving only the search query, the forum module 124 may invoke the classification module 120 to determine an entity associated with the search query. Also, upon being invoked, the forum module 124 may retrieve a user profile 128 of a user 104/106 associated with the query/entity and/or a search history 126 of the user 104/106. As mentioned above, the user 104/106 may be identified in a number of ways (e.g., browser/computer ID pair or social network login), and an identifier of the user 104/106 may be passed to the forum module 124 along with the query/entity.

In some implementations, the search history 126 and user profile 128 may each be a data store or structure (e.g., a relational database) storing information about multiple users 104/106. The search history 126 may include a record or structure associated with each user 104/106 that stores a history of a user's 104/106 interactions with a search engine 118, such as queries submitted, links provided as results, and links clicked on by the user 104/106. The search engine 118 may create and store the search history 126. The user profile 128 may also include a record or structure associated with each user 104/106 that stores information about a user 104/106, such as the user's 104/106 location, organization/employer, preferences, or social network information. This user profile information may be retrieved from various sources, such as user communications with the search engine 118, from cookies, or from a social network system, as described below with regard to FIG. 2. In one implementation, the search history 126 and user profile 128 are stored on another computing device, and the illustrated search history 126 and user profile 128 are copies of all or parts of the search history 126 and user profile 128 that are utilized by the search engine 118 and forum module 124.

In various implementations, the forum module 124 may utilize any or all of the search query, entity, or search history as search behavior representative of a user 104/106. Upon determining search behavior associated with a user 104/106, the forum module 124 determines search behavior of a plurality of other users and ranks those other users based on similarity of their search behavior to that of the user 104/106. The ranking may be based on string matching, pattern matching, machine learning, or other techniques for comparing search behavior and determining similarity of the search behavior. For example, if the first user 104 submitted "Inception" as a query, the forum module 124 may determine search queries of other users, such as second user 106, which are similar to "Inception." The more similar the query, the higher the other user is ranked.

These other users may include users currently being evaluated by the forum module 124, users currently engaged in communication with the search engine 118, users currently participating in a communication forum 110, or users that previously participated in a communication forum 110. The forum module 124 then selects a top N users from the ranking as users 104/106 that the user 104/106 should engage in a communication forum 110 with. The size of N may be determined by a threshold and may vary based on the popularity of the search query.

To facilitate the determination and ranking, the forum module 124 may store representations of search behavior associated with a plurality of users. For example, after determining the search behavior of the first user 104, the forum module 124 may store that search behavior and later retrieve it when determining a ranking of users associated with search behavior of the second user 106.

In some implementations, the forum module 124 further checks if the search behavior determined to be similar is associated with any stored or ongoing communication forums 110. When enabling a communication forum 110, the forum module 124 may store the similar search behavior that led to the communication forum 110 in conjunction with the communication forum 110. For example, the search behavior associated with a communication forum 110 may be stored in the forum store 132. If the forum module 124 determines that the search behavior is related to a previous or ongoing communication forum 110, the forum module 124 may add the user 104/106 to that communication forum 110 rather than create a new communication forum 110.

In various implementations, the forum module 124 may also utilize criteria 130 in ranking the other users or in filtering the users 104/106 selected as communication partners for the user 104/106. These criteria may include a number of weighted rules that utilize information found in the search histories 126 and user profiles 128. For instance, the criteria 130 may include an amount of time between search queries of different users, a location of a user, information retrieved from or associated with social networks, a preference for other users known to the user, or an organization of a user. The weights associated with these criteria may be determined based on the popularity of the search query. To determine the popularity, the forum module 124 invokes the popularity module 122, providing the popularity module 122 with the search query and receiving an indication of the query's popularity in response. If the search query is popular, the forum module 124 may increase the weights of the criteria 130. If unpopular, the forum module 124 may decrease the weights. Thus, for example, if the criteria 130 and user profile 128 indicate that the user 104/106 prefers to engage in communication forums 110 with persons known to the user 104/106, the weight given to that preference may be increased when the query is popular. In response to the increased weight, the ranking of other users 104/106 may be reordered or filtered.

Upon determining the other users 104/106 that the user 104/106 should engage in a communication forum 110 with, the forum module 124 enables the communication forum 110. In some implementations, enabling the communication forum 110 may include generating a list of the other users 104/106 and providing that list to the user 104/106 to enable the user 104/106 to select one or more of the other users 104/106. Upon selecting one or more of the other users 104/106, the user 104/106 may transmit indications of the users 104/106 that were selected to the search server 102 or may initiate the communication forum 110. In one implementation, as described above, the forum module 124 provides the user 104/106 with a browser plug-in that enables the user 104/106 to initiate the communication forum 110. In such an implementation, the forum module 124 may also provide an instruction to the user 104/106 to initiate the communication forum 110.

In various implementations, enabling the communication forum 110 includes initiating the communication forum 110 or providing instructions to another system to initiate the communication forum 110. The users 104/106 included in the communication forum 110 may be those determined by the forum module 124 or those selected by the user 104/106. In implementations where the communication forum is a bulletin board, scratch pad, or chat room, the forum module 124 creates the communication forum 110 as a web page and provides it to the users 104/106 selected to participate. If the communication forum 110 is a continuation of a previous communication forum 110, the contents of that previous communication forum 110 are retrieved and included in the web page. In one implementation, when reopening a previous communication forum 110, the forum module 124 provides an alert to participants that previously engaged in that communication forum 110 that the communication forum 110 has been read or updated. In implementations where the communication forum 110 is an instant messaging conversation, the forum module 124 may communicate with an instant messaging system to instruct the instant messaging system to initiate the communication forum 110, as shown and described in FIG. 2. To interact with and instruct the instant messaging system, the forum module 124 utilizes interfaces 134, which may include application programming interfaces (APIs) of the instant messaging system.

In some implementations, in addition to initiating the communication forum 110 or instructing another system to initiate the communication forum 110, the forum module 124 may provide the users 104/106 with an indication of the search behavior that the communication forum 110 is related to. For example, if the communication forum 110 is between the first user 104 and second user 106 about the search query "inception" or the entity "movies", the forum module 124 may provide indicate this by displaying text such as "Topic: Movies" in conjunction with the communication forum 110 for by causing another system to display such text.

In implementations where the communication forum 110 is provided by the forum module 124, the forum module 124 may receive comments added to the communication forum 110 from the users 104/106 and may update the communication forum 110 to include those comments. Also, the forum module 124 may store the contents of the communication forum 110 periodically or at the termination of the communication forum 110. These contents may be stored in the forum store 132, which may be a data store or structure capable of storing contents of communication forums 110, search behavior associated with the communication forum 110, and users 104/106 that have participated in the communication forum 110 at some point in time. In one implementation, the forum store 132 is public and searchable by the search engine 118. In such an implementation, the forum store 132 may store the contents of the communication forums 110 as web pages, and the search engine 118 may index, search, and retrieve these pages in the same manner it does other web pages.

In various implementations, the forum module 124 is further configured to enable entities or advertisers mentioned in a communication forum 110 to provide support or advertisements to the first user 104 and second user 106. For example, if the users 104/106 mention a technical problem with an HP® product, the forum module 124 may notify HP® of the problem, including part of the content of the communication forum 110 to enable HP® to provide support. The forum module 124 may then invite HP® technical support to join the communication forum 110 or may provide identification of the users 104/106 to enable HP® technical support to contact the users 104/106.

In another example, the forum module 124 may notify one or more advertisers based on interest or discussion of their product or of a topic related to their product. The forum module 124 or another component may then handle bidding between the advertisers, the winning bidder placing an advertisement in the communication forum 110 or in a separate web page. In some implementations, the user settings or preferences may include a setting or preference not to receive advertisements or support. In such implementations, the forum module 124 refrains from enabling entity/advertiser support or advertising and optionally charges the user for opting out from the support or advertising.

In some implementations, the forum module 124 may include in the communication forum 110 links to other communication forums 110 having related search behavior or shared users 104/106. The forum module 124 may include such links when, for example, multiple previous or ongoing communication forums 110 are associated with the search behavior.

In various implementations, the forum module 124 may also enable a social network to publish comments from the communication forum 110 by a user 104/106 to that user's 104/106 social network. Upon receiving comments from a user 104/106, for example, the forum module 124 determines from the user profile 128 whether the user is associated with a social network and, if the user is associated with a social network, provides the comments to the social network via the interfaces 134, which may include APIs of the social network.

At any time, the forum module 124 may invoke the reranking module 136 to refine the search engine's ranking algorithm and index or the classification module's algorithm based on the contents of communication forums 110. For example, the reranking module 136 may retrieve communication forum contents from the forum store 132 and utilize those contents to determine a more specific entity for a search query. If the query were "Inception" and much of the discussion included comparisons to other known science fiction movies, then the reranking module 136 may influence the classification module 120 to associate the entity "science fiction movies" with the query "Inception."

Example Network Interactions

Figure 2:
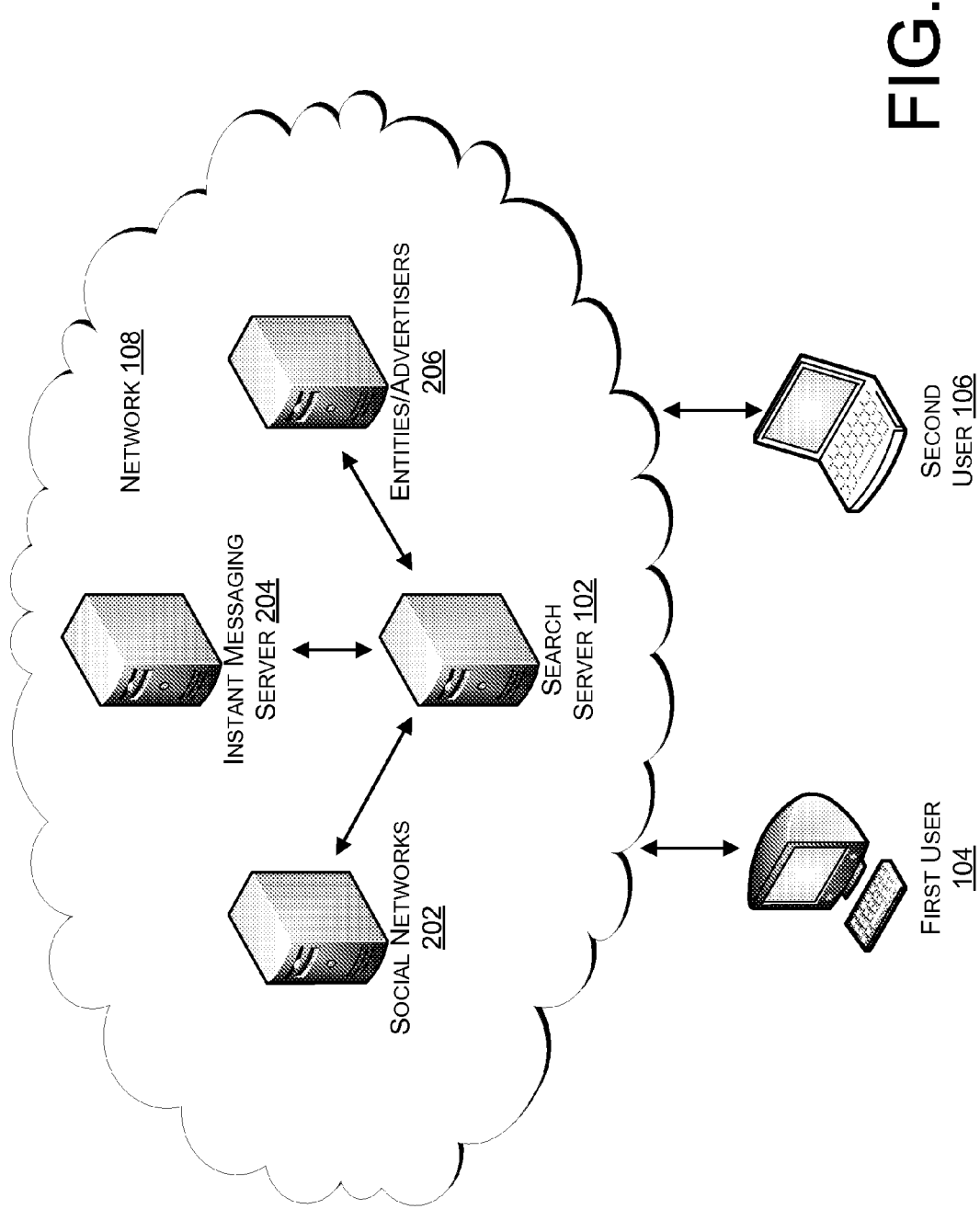
FIG. 2 shows network interactions of a server system or users with other network-connected systems, in accordance with various embodiments.

FIG. 2 shows network interactions of a server system or users with other network-connected systems, in accordance with various embodiments. As shown, social networks 202, instant messaging (IM) systems 204, and entities or advertiser 206 may be connected to server system 102, first user 104, or second user 106 by network 108, enabling interactions between the systems. Systems 202-206 are provided simply for the sake of illustration and any number of other systems may also be accessed by the search server 102 or the users 104/106 over the network 108.

The server system 102, first user 104, second user 106, and network 108 may be the same systems and network illustrated in FIG. 1 and may interact with each other in the manner described above with regard to FIG. 1.

In various implementations, the social networks 202 may include any number of social networking systems, such as Facebook® and Twitter®. These social networks 202 often provide mechanisms to allow outside content providers, such as blogs, to have their content posted to the social networks 202. These mechanisms or others may be utilized by the search server 102, in the manner described above, to enable publishing of comments from communication forums 110 to social networks 202. In some implementations, these mechanisms may include APIs, which may be included among the interfaces 134. The search server 102 may also retrieve settings or preferences from the social networks 202 that are associated with the users 104/106. For example, if a user 104/106 has heightened privacy settings, the contents of the communication forum 110 may be restricted from search use by the search engine 118. These settings or preferences may likewise be retrieved using interfaces 134. Further, information from the social networks 202 may be used as criteria 130. For instance, if the social networks 202 have a user profile that includes a location, employer, etc., this information may be added to the user profile 128 and the criteria 130 either when applying the criteria 130 or at some other time independently of applying the criteria 130.

In some implementations, the search server 102 may also interact with instant messaging systems 204 in the manner described above with reference to FIG. 1. The search server 102 may retrieve lists of buddies of the users 104/106 and use these to filter or weigh based on a preference for other users 104/106 that are known to the user 104/106. The search server 102 may also instruct the instant messaging systems 204 to initiate the communication forum 110 as an instant messaging conversation between the first user 104 and the second user 106. As mentioned above, the search server 102 may interact with the instant messaging systems 204 via the interfaces 134, which may include APIs of the instant messaging systems 204.

In further implementations, the search server 102 may interact with entities or advertisers 206 in the manner described above with reference to FIG. 1. The search server 102 may notify an entity or advertiser of a support or advertising opportunity and may enable bidding on the support or advertising opportunity. Also, the search server 102 may allow technical support personnel to join in the communication forum 110 or may include an advertisement from the winning bidder in the communication forum 110. In other implementations, the search server 102 may provide the entities or advertiser 206 with information identifying the user 104/106 to enable the entities or advertiser 206 to communicate directly with the user 104/106.

Example Operations

Figure 3:
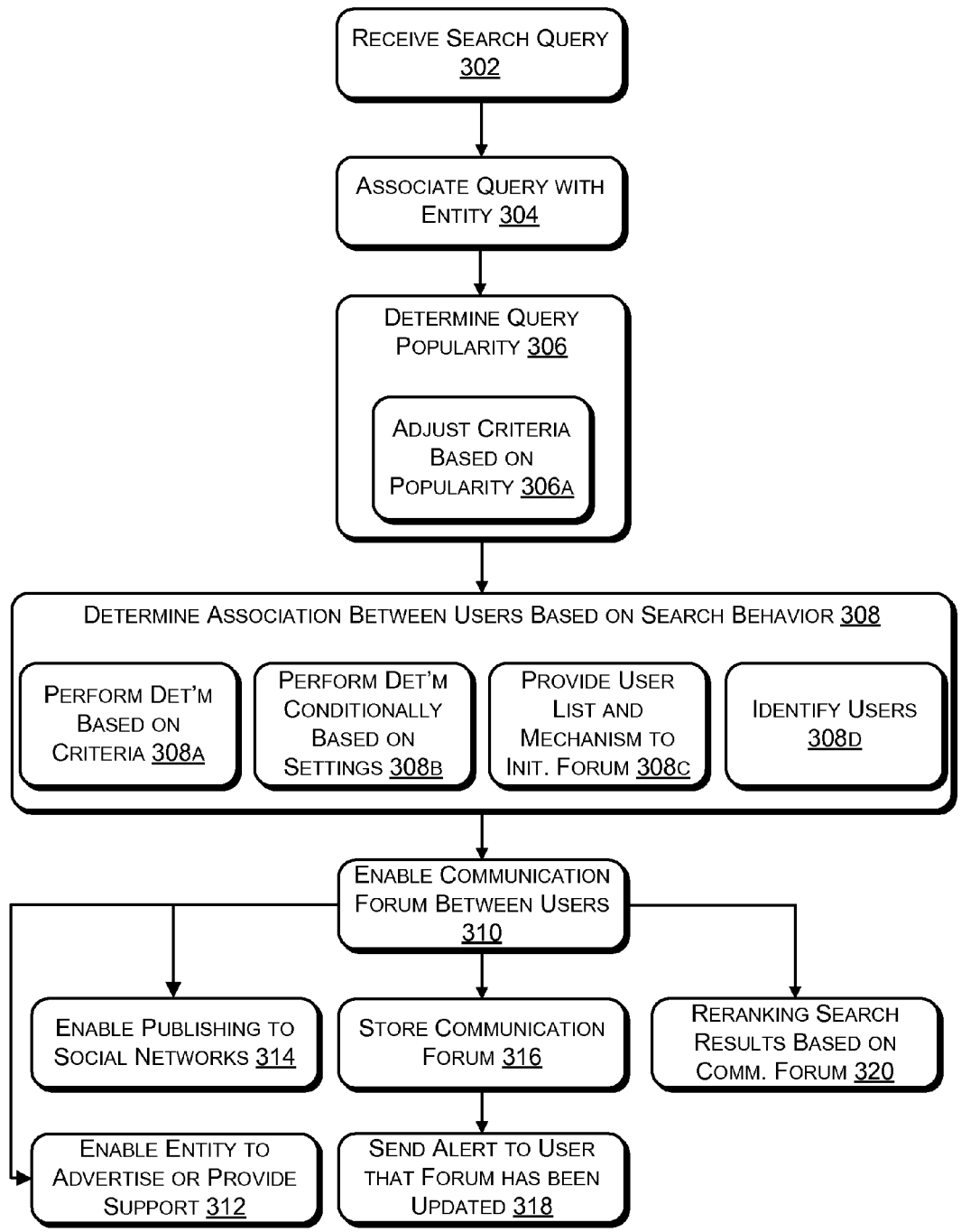
FIG. 3 is a flowchart showing a method of determining association between users based at least on search behavior and enabling communication forums between the users, in accordance with various embodiments.

FIG. 3 is a flowchart showing a method of determining association between users based at least on search behavior and enabling communication forums between the users, in accordance with various embodiments. The operations of the method are illustrated in individual blocks and summarized with reference to those blocks. The operations may be performed in hardware or as processor-executable instructions (software or firmware) that may be executed by one or more processors.

As illustrated at block 302, one or more computing devices receive a search query from a first user. At block 304, upon receiving the search query, the one or more computing devices associate the search query and other search behavior with an entity, the entity being associated with both of the first user and a second user. The other search behavior may include a pattern of previous searches, previous search results, or interactions with search results. For instance, the other search behavior may include a search associated with the first user and a search associated with the second user, the searches being concurrent.

At block 306, the one or more computing devices determine the popularity of the search query. As shown at block 306a, this may involve adjusting one or more criteria based at least on the popularity of the search query. The criteria may include one or more of an amount of time between search queries of different users, a location of a user, information retrieved from or associated with social networks, or an organization of a user. For example, the one or more criteria may include a preference for users known to the first user or the second user, and the adjusting involves adjusting the preference by giving increased weight to the preference when the search query is determined to be popular.

At block 308, the one or more computing devices determine an association between at least the first user and the second user based at least on search behavior of one or both of the first user or the second user, the search behavior including one or both of the search query or the other search behavior. As shown at block 308a, the determining may involve determining the association based on the one or more criteria. Alternatively or additionally, at block 308b, the determining may involve conditioning participation in a communication forum on one or more settings or preferences of the first user or the second user, the settings or preferences associated with a browser, a search engine, or a social network. Alternatively or additionally, at block 308c, the determining may involve providing a list of potential communication partners and providing a mechanism for initiating a communication forum to communicate with one or more of the potential communication partners. Alternatively or additionally, at block 308d, the determining may involve identifying at least one of the first user and the second user by either a pair of a computing device identifier and a browser identifier or a social network login.

At block 310 the one or more computing devices, in response to the determining, enable a communication forum between at least the first user and the second user. Such the enabling may comprise initiating the communication forum, providing an instruction to one or both of the first user or the second user to initiate the communication forum, or providing one or both of the first user or the second user with a list of other users having similar search behavior. The communication forum may be a web bulletin board, a chat room, an instant messaging conversation, a video conference, a video call, an audio conference, an audio call, or a scratch pad. Also, the communication forum might not interfere with browsing or search behavior of the first user or the second user. Further, the communication forum may include one or more links to one or more other communication forums.

At block 312, the one or more computing devices enable an entity discussed in the communication forum to provide an advertisement or support to at least one of the first user or the second user.

At block 314, the one or more computing devices enable publishing of comments entered in the communication forum to one or more social networks, blogs, or web pages.

At block 316, the one or more computing devices store contents of the communication forum for subsequent retrieval. In some implementations, the stored contents are public and searchable by other users. At block 318, the one or more computing devices send an alert to a previous communication forum participant that the communication forum has been updated.

At block 320, the one or more computing devices rerank search results based at least on contents of the communication forum.

Example System Architecture

FIG. 4 is a block diagram of an example computer system architecture, in accordance with various embodiments. The computing device 400 illustrated in FIG. 4 may represent server system 102, first user 104, second user 106, or any other computing device associated with the server system 102. As illustrated, computing device 400 comprises a system memory 402 storing modules and data 404. Also, computing device 400 includes processor(s) 406, a removable storage 408 and non-removable storage 410, input device(s) 412, output device(s) 414 and communication connections 416 for communicating with other computing devices 418.

In various embodiments, system memory 402 is volatile (such as RAM), non-volatile (such as ROM, flash memory, etc.) or some combination of the two. The modules or data 404 stored in the system memory 402 may comprise methods, threads, processes, applications or any other sort of executable instructions, such as the instructions utilized to perform the operations of server system 102, first user 104, or second user 106. For example, modules or data 404 may include any one or more of browser 112, clients 114, settings/history 116, search engine 118, classification module 120, popularity module 122, forum module 124, search histories 126, user profiles 128, criteria 130, forum store 132, interfaces 134, or reranking module 136. These modules/data 112-136 are described above in detail.

In some embodiments, the processor(s) 406 is a central processing unit (CPU), a graphics processing unit (GPU), or both CPU and GPU, or other processing unit or component known in the art.

Computing device 400 also includes additional data storage devices (removable and/or non-removable) such as, for example, magnetic disks, optical disks, or tape. Such additional storage is illustrated in FIG. 4 by removable storage 408 and non-removable storage 410. Storage 408 and 410 may include volatile and nonvolatile, removable and non-removable media implemented in any method or technology for storage of information, such as computer readable instructions, data structures, program modules, or other data.

Memories 402, 408, and 410 are examples of computer-readable media. Computer-readable media includes at least two types of computer-readable media, namely computer storage media and communications media.

Computer storage media includes volatile and non-volatile, removable and non-removable media implemented in any method or technology for storage of information such as computer readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. Any such computer storage media may be part of computing device 400.

In contrast, communication media may embody computer readable instructions, data structures, program modules, or other data in a modulated data signal, such as a carrier wave, or other transmission mechanism. As defined herein, computer storage media does not include communication media.

Computing device 400 also has input device(s) 412, such as a keyboard, a mouse, a touch-sensitive display, voice input device, etc., and output device(s) 414 such as a display, speakers, a printer, etc. These devices are well known in the art and need not be discussed at length here.

Computing device 400 also contains communication connections 416 that allow the computing device 400 to communicate with other computing devices 418, such as any of server system 102, first user 104, second user 106, social networks 202, IM server 204, or Entities/Advertisers 206.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

We claim:

1. A method comprising:
    determining, by one or more computing devices, similarity in search behavior of a first user and search behavior of a second user, wherein the similarity in the search behaviors includes at least similar interactions with search results;
    forming, by the one or more computing devices, an association between at least the first user and the second user based at least on the determined similarity in the search behaviors; and
    in response to the forming the association, enabling, by the one or more computing devices, a communication forum between at least the first user and the second user.

2. The method of claim 1, wherein the similarity in the search behaviors further includes at least one of similar search queries, similar patterns of previous searches, or previous similar search results.

3. The method of claim 1, wherein the forming further comprises associating the search behaviors with an entity, the entity being associated with both of the first user and the second user.

4. The method of claim 1, wherein the forming is further based on criteria including one or more of an amount of time between similar search queries of the first and second users, locations of the first and second users, information retrieved from or associated with social networks, or an organization of the first user and/or the second user.

5. The method of claim 1, wherein the search behaviors include a search associated with the first user and a search associated with the second user, the searches being concurrent.

6. The method of claim 1, further comprising conditioning participation in the communication forum on one or more settings or preferences of either the first user or the second user, the settings or preferences associated with a browser, a search engine, or a social network.

7. The method of claim 1, further comprising:
providing, based on the determined similarity in search behaviors, a list of potential communication partners to a device associated with the first user, the list of potential communication partners including the second user; and
providing, to the device associated with the first user, a mechanism for initiating the communication forum.

8. The method of claim 1, further comprising identifying at least one of the first user and the second user by either:
a pair of a computing device identifier and a browser identifier, or
a social network login.

9. A system comprising:
one or more processors; and
instructions configured to be executed by the one or more processors to perform operations including:
determining one or more similarities in search behavior of a first user and search behavior of a second user, wherein the one or more similarities include at least similar interactions with search results;
forming an association between at least the first user and the second user based at least on the determined one or more similarities; and
in response to the forming, enabling a communication forum between at least the first user and the second user.

10. The system of claim 9, wherein the communication forum comprises a web bulletin board, a chat room, an instant messaging conversation, a video conference, a video call, an audio conference, an audio call, or a scratch pad forum that aggregates communications from a plurality of communication forums.

11. The system of claim 9, wherein the communication forum does not interfere with browsing or search activity of the first user or the second user.

12. The system of claim 9, wherein the operations further include providing, or enabling provision of, based on contents of communications of the communication forum, an advertisement or support to at least one of the first user or the second user.

13. The system of claim 9, wherein the operations further include storing contents of the communication forum for subsequent retrieval.

14. The system of claim 13, wherein the stored contents are public and searchable by other users.

15. The system of claim 9, wherein the operations further include sending an alert to a previous communication forum participant that the communication forum has been updated.

16. The system of claim 9, wherein the operations further include enabling publishing of comments entered in the communication forum to one or more social networks, blogs, or web pages.

17. The system of claim 9, wherein the operations further include reranking search results based at least on contents of the communication forum.

18. The system of claim 9, wherein the enabling comprises initiating the communication forum, providing an instruction to one or both of the first user or the second user to initiate the communication forum, or providing one or both of the first user or the second user with a list of other users having similar search behavior.

19. One or more computer-readable storage media comprising computer-executable instructions stored on the computer-readable storage media and configured to program one or more computing devices to perform operations including:
receiving a search query from a first user;
determining a popularity associated with the search query;
determining that there are one or more similarities between search behavior of the first user and search behavior of a second user, the search behavior of the first user including at least the search query, the one or more similarities including similar interactions with search results;
associating at least the first user and the second user based at least on the one or more similarities and one or more criteria, the one or more criteria weighted based at least on the popularity of the search query; and
in response to the determining, enabling a communication forum between at least the first user and the second user.

20. The one or more computer-readable storage media of claim 19, wherein the one or more criteria include a preference for users known to the first user or the second user, and the operations further include adjusting the preference by giving increased weight to the preference when the search query is determined to be popular.

21. The one or more computer-readable storage media of claim 19, wherein the similar interactions with search results include clicks on the search results.

* * * * *